(12) United States Patent
Hosotsubo et al.

(10) Patent No.: US 9,727,208 B2
(45) Date of Patent: Aug. 8, 2017

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Toshihiko Hosotsubo, Kamakura (JP); Kentaro Suzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 307 days.

(21) Appl. No.: 13/693,736

(22) Filed: Dec. 4, 2012

(65) Prior Publication Data

US 2013/0145318 A1    Jun. 6, 2013

(30) Foreign Application Priority Data

Dec. 6, 2011   (JP) ................. 2011-266747

(51) Int. Cl.
*G06F 3/0482*      (2013.01)
*G06F 17/30*       (2006.01)

(52) U.S. Cl.
CPC ...... *G06F 3/0482* (2013.01); *G06F 17/30011* (2013.01)

(58) Field of Classification Search
CPC .. G06F 3/048; G06F 17/30861; G06F 17/212; H04M 1/72561
See application file for complete search history.

(56) References Cited

U.S. PATENT DOCUMENTS

| 7,043,700 | B1* | 5/2006 | Bertram et al. ............. 715/811 |
| 8,170,003 | B2* | 5/2012 | Sasaki et al. ................ 370/352 |
| 8,434,024 | B2* | 4/2013 | Curtis ........................... 715/811 |
| 2005/0132014 | A1* | 6/2005 | Horvitz et al. ............... 709/206 |
| 2006/0277455 | A1* | 12/2006 | Yamada et al. ........... 715/501.1 |
| 2010/0205292 | A1* | 8/2010 | Diaz ................ H04L 12/40013 709/224 |
| 2010/0223078 | A1* | 9/2010 | Willis et al. ...................... 705/4 |
| 2011/0302531 | A1* | 12/2011 | Takushima .................. 715/811 |
| 2012/0221931 | A1* | 8/2012 | Gleadall .......... G06F 17/30902 715/208 |

FOREIGN PATENT DOCUMENTS

JP    2008-282098 A    11/2008

OTHER PUBLICATIONS

Title—Refresh / Pause Automatic Refresh Date: Jul. 2, 2011.*

* cited by examiner

*Primary Examiner* — Jeffrey A Gaffin
*Assistant Examiner* — Mandrita Brahmachari
(74) *Attorney, Agent, or Firm* — Canon USA, Inc. IP Division

(57) ABSTRACT

A determination is made on whether or not an instruction of temporarily stopping a recommendation list is issued, and in a case where it is determined that the instruction for the temporary stopping is issued, even when another item is selected by a user, a control is conducted to avoid an update of the displayed recommendation list.

13 Claims, 14 Drawing Sheets

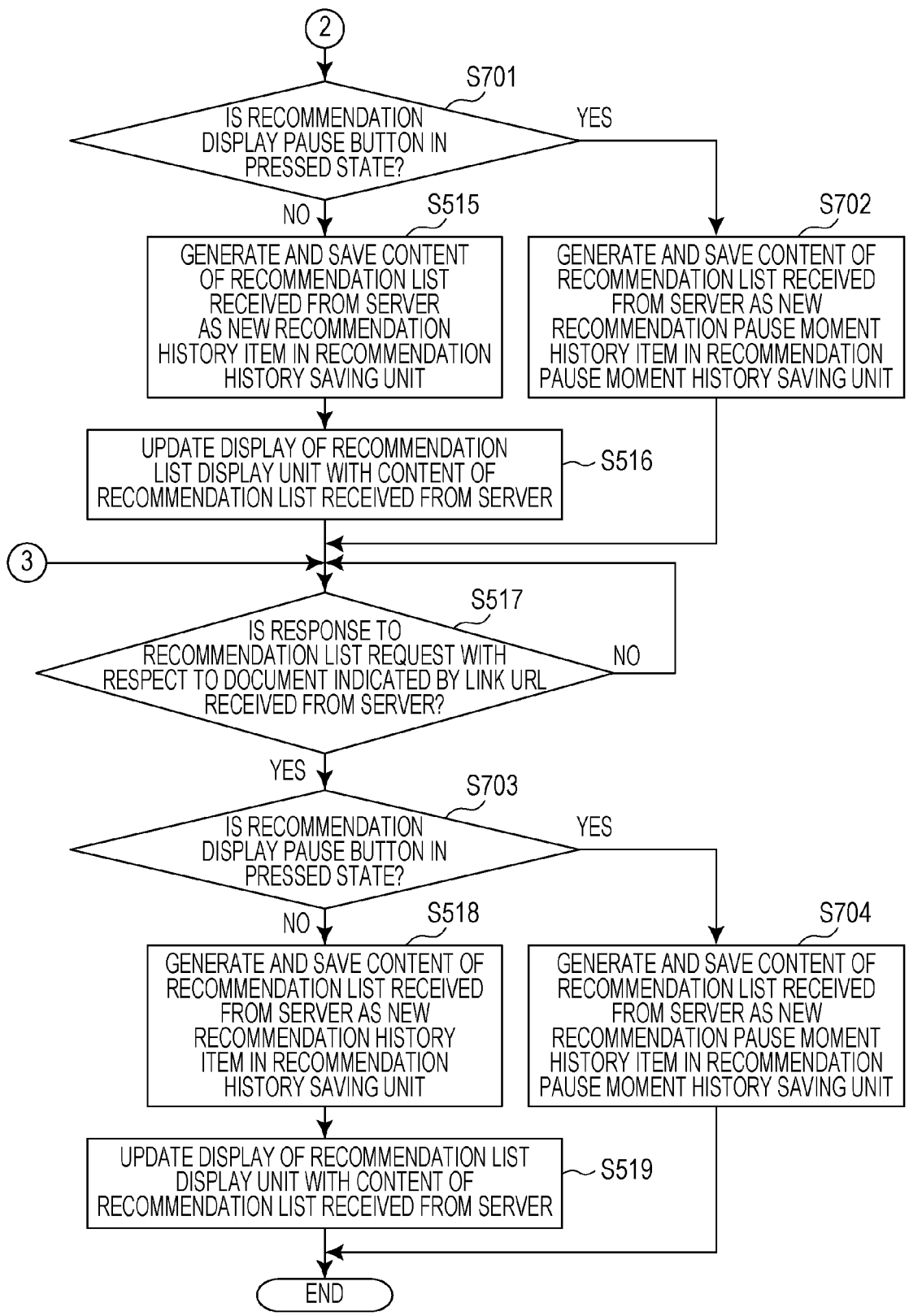

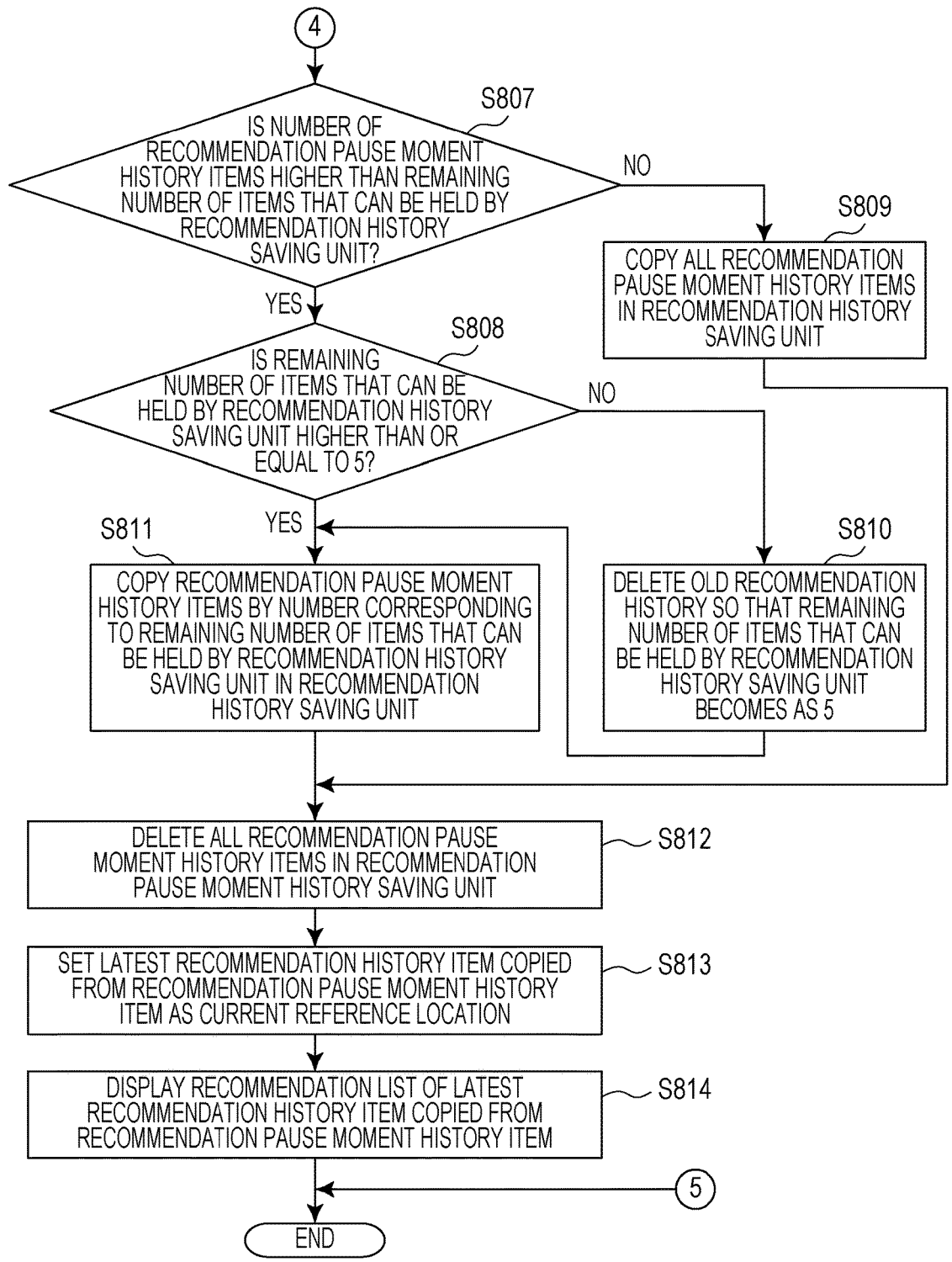

INFORMATION PROCESSING APPARATUS, INFORMATION PROCESSING METHOD, AND STORAGE MEDIUM

BACKGROUND OF THE INVENTION

Field of the Invention

The present invention relates to a recommendation technology for presenting information on an item related to a selected item through an operation by a user, as a recommended item to the user.

Description of the Related Art

Japanese Patent Laid-Open No. 2008-282098 proposes a system in which when detailed information on a product clicked by a user is displayed as a Web page, plural recommended products related to the clicked product are displayed in a recommendation information display column on the same Web page.

In the above-described system, in a case where one of the products displayed in the recommendation information display column is clicked, the Web page is switched to a Web page where detailed information on the clicked recommended product is displayed. Along with the switching to the Web page where the detailed information on the newly clicked product is displayed, the display in the recommendation information display column is also switched to information on recommended products related to the newly clicked product.

According to Japanese Patent Laid-Open No. 2008-282098, in a case where the user is interested in plural products among the recommended products displayed on the recommendation information display column, in order to view detailed information on each of the products of interest, the user clicks the respective products. However, when one product among the displayed recommended products is clicked, the display in the recommendation information display column is also updated on the basis of the relevant clicked product. Therefore, after the detailed information on the relevant clicked product is checked, the user restores the display to the Web page where the recommended products are first displayed. To restore the display to the original Web page, a back button in a Web browser for displaying the Web page is used in general. For that reason, in a case where the user wishes to view the details of the plural recommended products displayed in the recommendation information display column, the user repeatedly performs the operation in which after one product is clicked in the recommendation information display column, the back button of the Web browser is clicked, and again, another product is clicked in the recommendation information display column.

However, it is bothersome for the user to press the back button of the Web browser for only restoring the information in the recommendation information display column, and this operation is troublesome. Furthermore, in a case where the display is restored to the Web page where the detailed information on the original product is displayed using the back button of the Web browser, a recommended product different from the previous recommended product may be displayed in the recommendation information display column in some cases. This is because the recommendation information related to the relevant product may be updated in real time on a Web server side in some cases, and when the back button of the Web browser is pressed, instead of the cached Web page on the Web browser side, a Web page newly obtained from the Web server may be displayed in some cases. In that case, the recommended product that the user has been interested in at the time of the previous recommendation information display might not be displayed at the time of the next recommendation information display.

SUMMARY OF THE INVENTION

To solve the above-mentioned problem, according to an aspect of the present invention, there is provided an information processing apparatus including: an item display unit configured to display a plurality of items; a recommendation display unit configured to display a recommendation list including information on a recommended item related to an item selected by a user; a determination unit configured to determine whether or not an instruction for temporarily stopping the recommendation list displayed on the recommendation display unit is issued; and a control unit configured to perform, in a case where the determination unit determines that the instruction for the temporary stopping is not issued, when another item is selected by the user, a control of updating the recommendation list displayed on the recommendation display unit to a recommendation list related to the selected other item to be displayed, and in a case where the determination unit determines that the instruction for the temporary stopping is issued, even when the other item is selected by the user, a control of avoiding the update of the recommendation list displayed on the recommendation display unit.

According to the aspect of the present invention, it is possible to temporarily cease the update of the recommendation information in accordance with the instruction of the user. That is, the user can desirably stop the update of the recommendation information displayed in the recommendation information display column. For example, in a case where the user is interested in plural items among the recommended items displayed in the recommendation information display column, after the update of the recommendation information display is stopped by using a pause button, to view the individual pieces of detailed information, the respective items can be easily checked.

Further features of the present invention will become apparent from the following description of exemplary embodiments with reference to the attached drawings.

BRIEF DESCRIPTION OF THE DRAWINGS

FIGS. 9A and 9B are flow charts of an operation at a time of opening a document in a recommended list of the document management client application according to the second exemplary embodiment of the present invention.

FIGS. 10A and 10B are flow charts of an operation at a time when a recommendation display pause button is changed from a pressed state to a non-pressed state by the document management client application according to the second exemplary embodiment of the present invention.

DESCRIPTION OF THE EMBODIMENTS

First Embodiment

Figure 1:
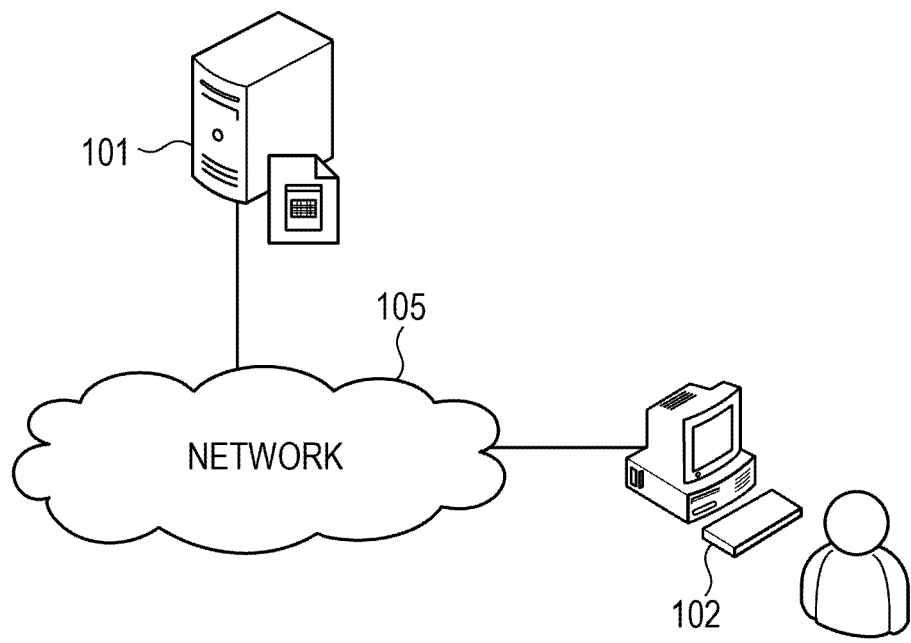
FIG. 1 is a schematic diagram for describing a system configuration according to a first exemplary embodiment of the present invention.

FIG. 1 is a schematic diagram for describing a system configuration according to a first exemplary embodiment of the present invention. As illustrated in FIG. 1, network-compatible information processing apparatuses (101 and 102) are connected to a network 105 such as the Internet or an intranet. The document management server 101 is configured to provide general document management services such as saving and searching for items (documents and folders). The client PC (client computer) 102 is configured to execute a document management client application utilizing a document management service provided by a document management server. It is noted that although not illustrated in FIG. 1, plural client PCs 102 may be connected via the network 105. The document management client application may be application software executed on various operating systems such as Microsoft Windows® but may also be an application executed on a Web browser. It is noted that in a case where the network 105 is the Internet, the document management server 101 may also utilize a cloud service. In that case, a proxy server, a Web server, and the like are to be added to the system configuration, but since the configuration is a general cloud service configuration, a detailed description thereof will be omitted.

Figure 2:
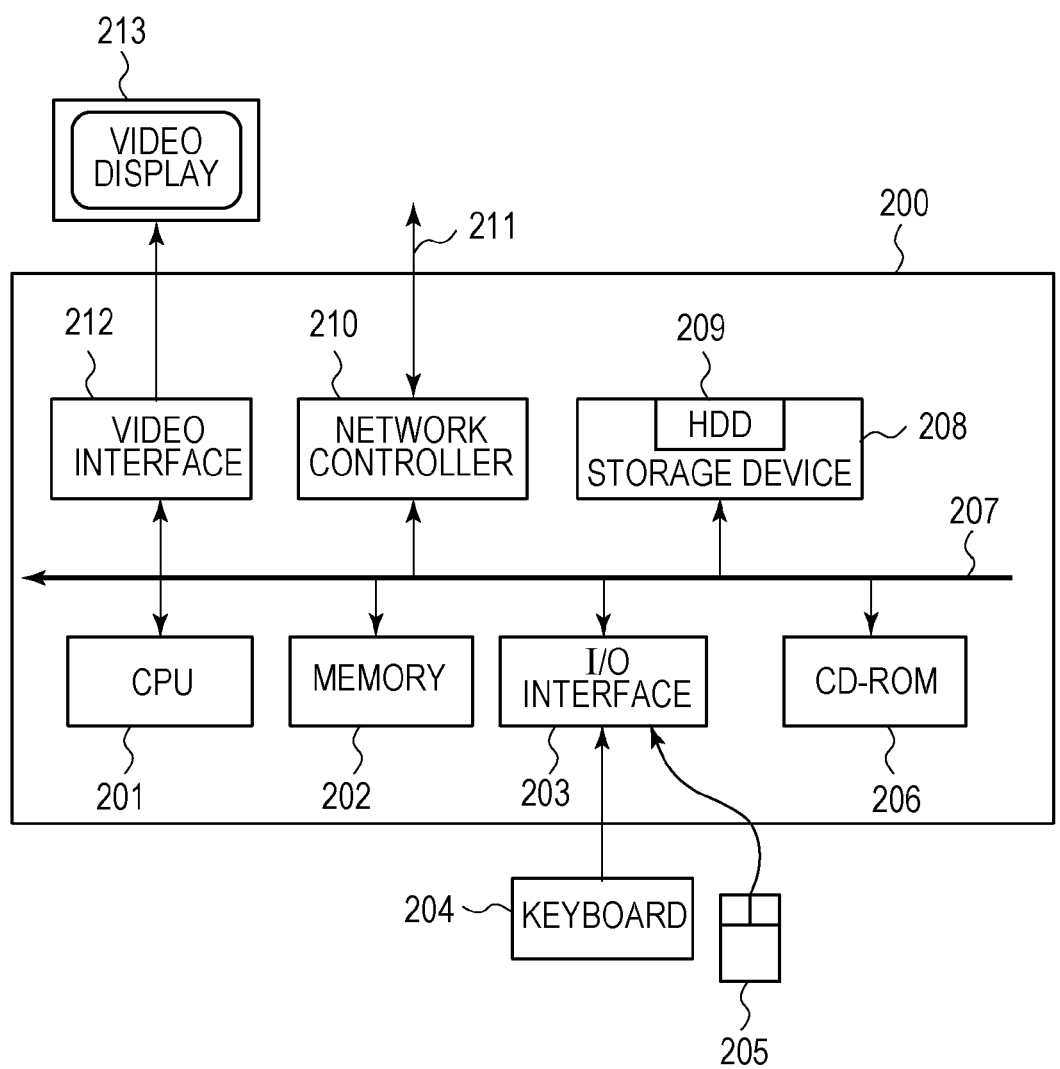
FIG. 2 is a block diagram for describing a configuration of a typical general-purpose computer module according to the first exemplary embodiment of the present invention.

FIG. 2 is a block diagram for describing a configuration of a typical general-purpose computer module 200 used according to the present embodiment. In the general-purpose computer module, the document management server 101 and the client PC 102 are realized by executing respective computer programs (a document management server program and a document management client program).

An input apparatus including a pointing device such as a keyboard 204 or a mouse 205 and an output apparatus such as a video display 213 are connected to the general-purpose computer module 200. A network controller (NC) 210 is connected to the network 105 via a network interface 211 and configured to execute communication control processing with another network device. A CPU 201 is composed of at least one processor. A memory 202 is composed of a RAM or a ROM. A video interface 212 is configured to output an image to the video display 213. An I/O interface 203 is configured to receive an input through an operation from the keyboard 204 or the mouse 205. A storage device 208 typically includes a hard disc drive (HDD) 209. A silicon drive that is not illustrated in the drawing may also be included. A CD-ROM drive 206 is used as a non-volatile data source. An interconnection bus 207 serves as an intermediate for communications between respective blocks in a manner following an operating system such as Microsoft Windows® that is operated on the general-purpose computer module 200 by the CPU 201.

It is noted that various control programs for causing the document management server 101 and the client PC 102 to execute the processing later described with a flow chart are stored in a storage unit of any one of the memories 202 and the storage device 208 of the respective apparatuses and the storage device 208 of the respective apparatuses and executed by the respective CPUs 201. That is, the control programs (computer programs) for causing a computer (CPU) to function as a respective processing units that will be described below are stored in a computer-readable storage medium.

Further, the document management server 101 includes a database for the document management, and the database is also constructed on the storage device 208.

Figure 3:
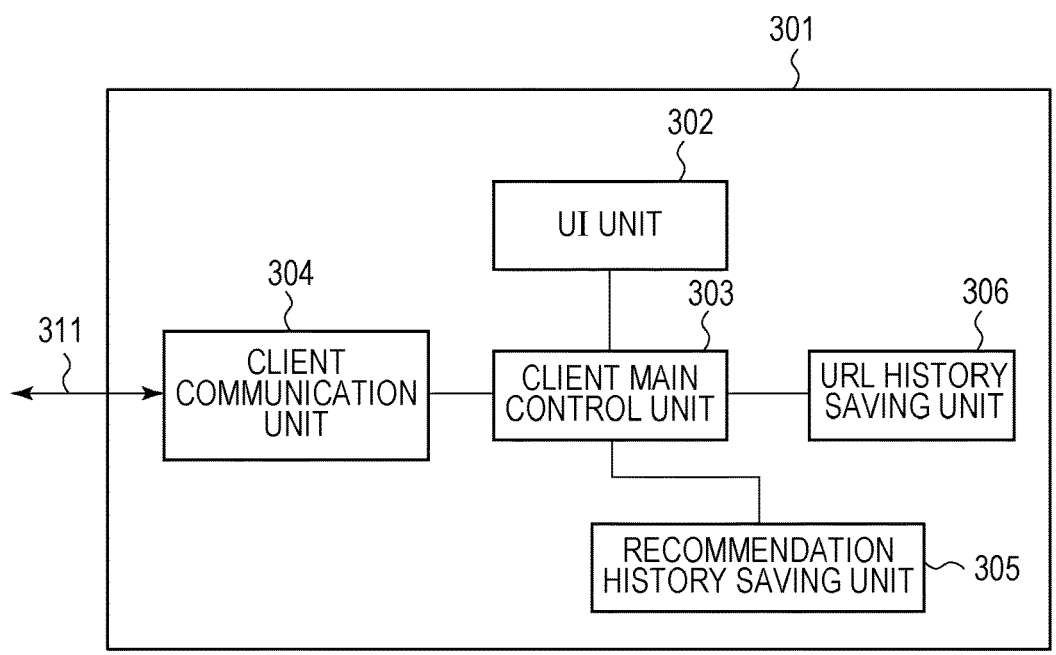
FIG. 3 is a block diagram for describing a software configuration of a document management client application.

FIG. 3 is a block diagram for describing a software configuration of the document management client application. A document management client application 301 is provided with a user interface that displays document information or the like on a screen of the video display 213 and accepts requests from a user by the keyboard 204 and the mouse 205 to execute the respective function processes. Reference signs 302 to 305 denote respective components constituting the application.

Figure 4:
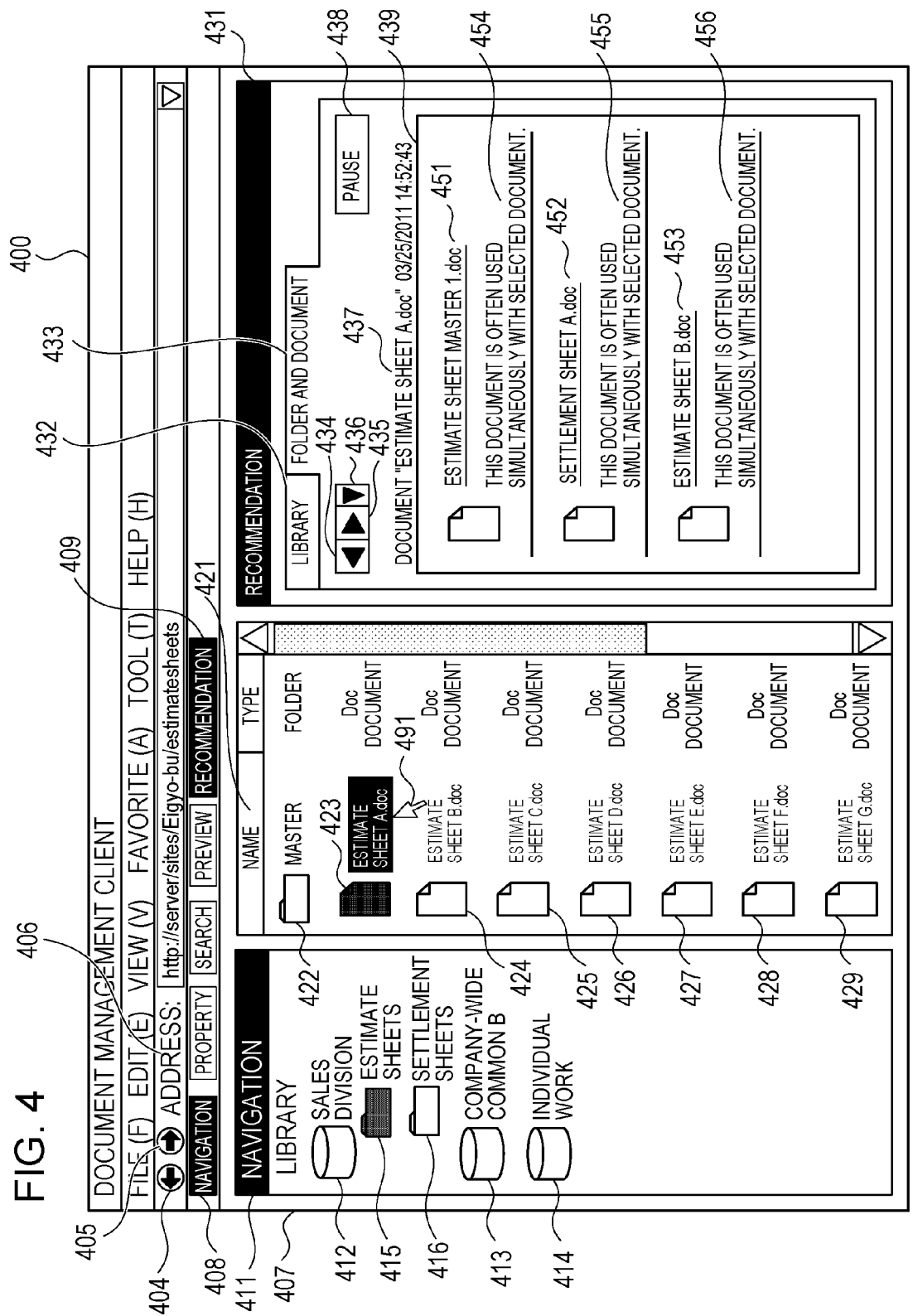
FIG. 4 illustrates a display example of a UI unit of the document management client application.
Figure 5:
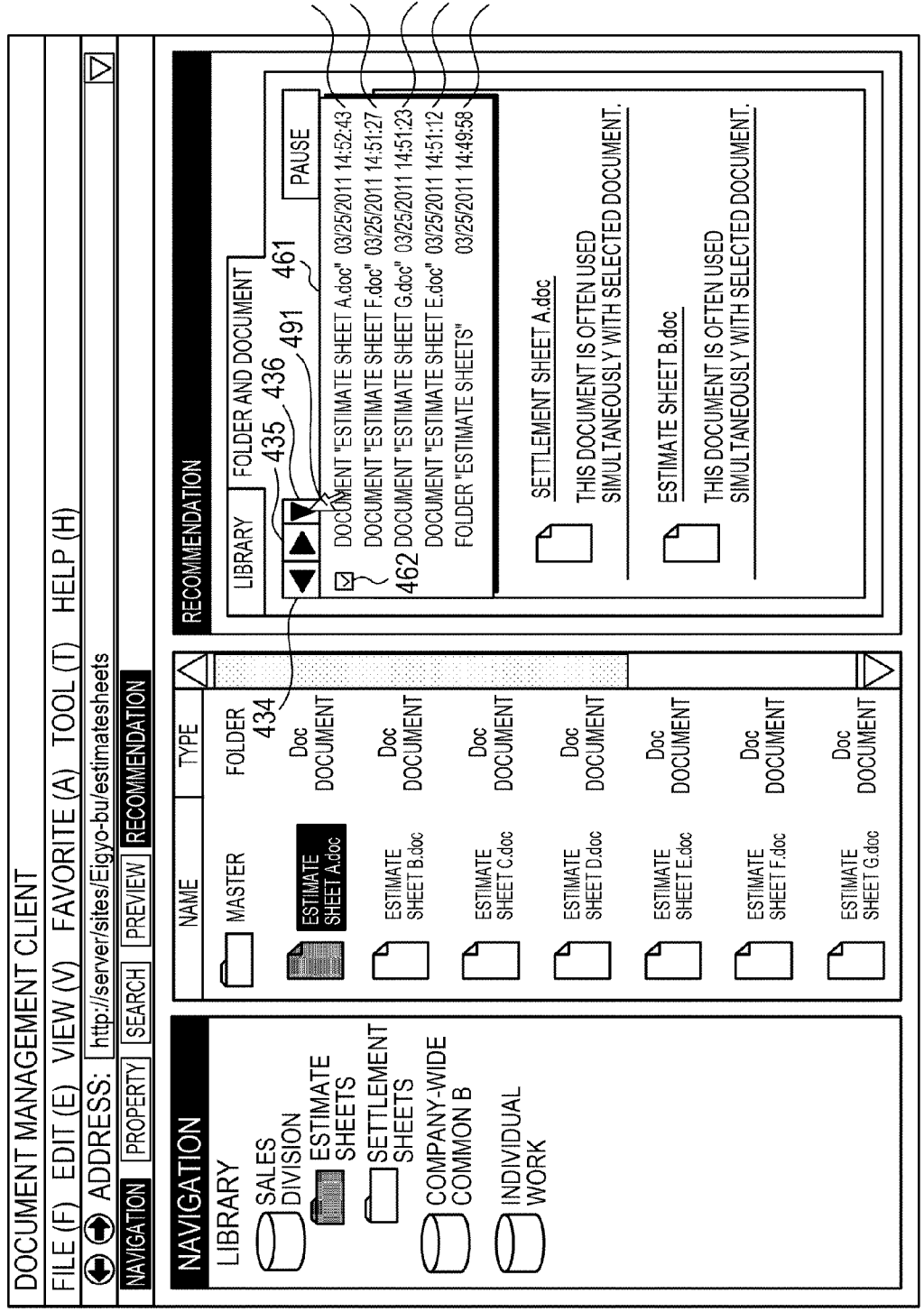
FIG. 5 illustrates another display example of a UI unit of the document management client application.
Figure 6:
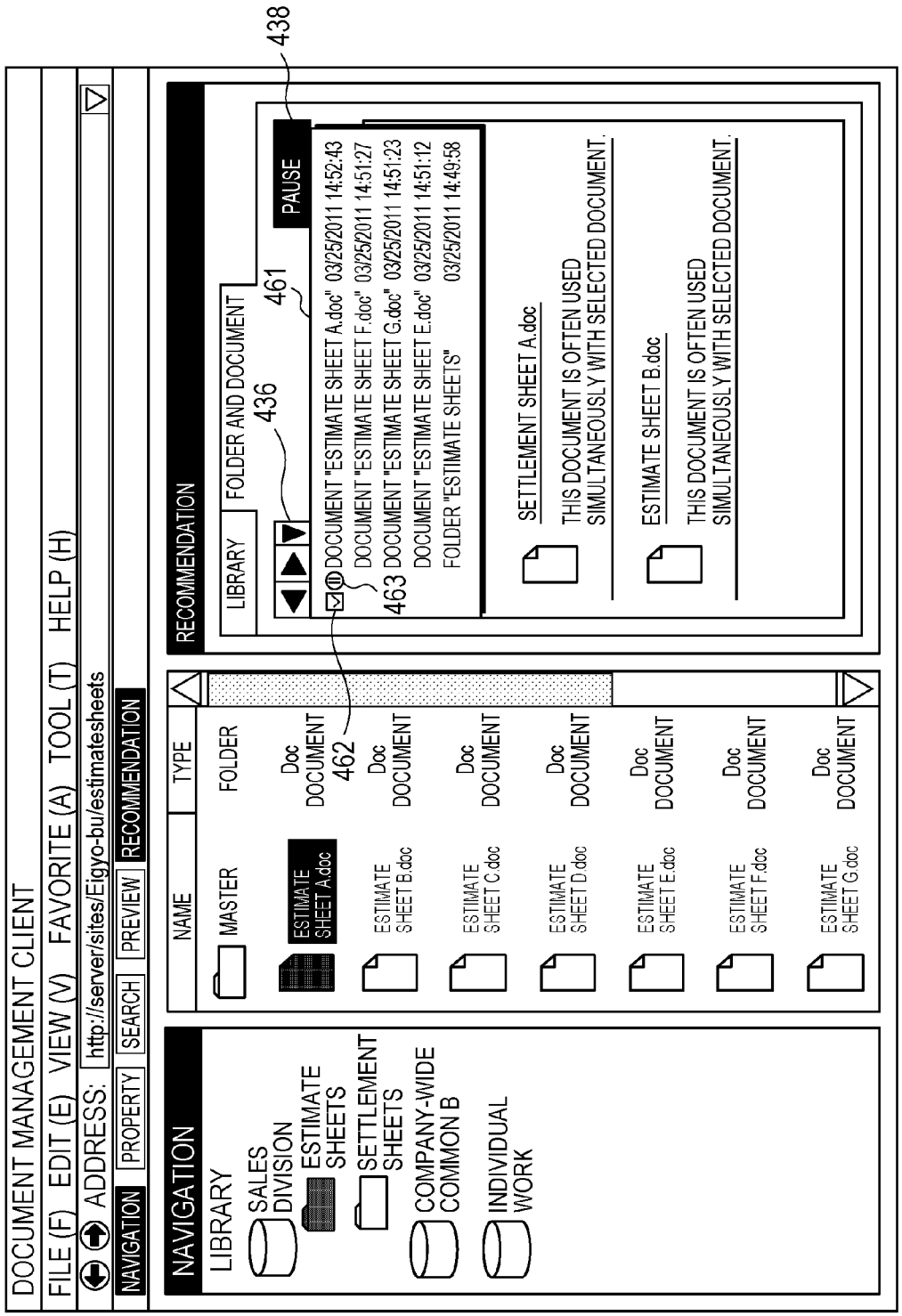
FIG. 6 illustrates still another display example of a UI unit of the document management client application.

A UI unit 302 is configured to construct user interfaces illustrated in FIGS. 4 to 6, accept the respective input operations from the user, and display processing results based on the input operations and recommendation results.

A client main control unit 303 is configured to determine a document operation request received from the user via the UI unit 302, issue a request to the document management server 101 to perform the document operation or obtain the recommendation list via a client communication unit 304, and request a response. Subsequently, the client main control unit 303 changes the display of the UI unit 302 on the basis of the response result received from the document management server 101. The client main control unit 303 is executed by the CPU 201.

The client communication unit 304 is configured to perform a communication with the document management server 101 on the basis of a control by the client main control unit 303.

The recommendation history saving unit 305 is configured to save a recommendation list received by the client main control unit 303 as a response to the obtainment of the recommendation list from the document management server 101, as a recommendation history in the memory 202 or the HDD 209. The recommendation list is composed of information on a name of a recommended item (a document or a folder) related to the item selected by the user (the document or the folder), a URL, a recommendation reason, and the like. Each time the client main control unit 303 obtains the recommendation list from the document management server 101, the client main control unit 303 generates in the recommendation history saving unit 305 one recommendation history item corresponding to the relevant recommendation list.

In the recommendation history item, the information on the recommendation list, the information on whether or not the item is a recommendation history item at a current reference location, and the information on whether or not the location is a pause location are held. The information on whether or not the item is the recommendation history item at the current reference location and the information on whether or not the location is the pause location are held in a format of TRUE/FALSE. It is noted that details of the current reference location of the recommendation history item and the pause location will be described below.

A URL history saving unit 306 is configured to save information on a URL indicating a location of a library or a folder that is moved on the document management server 101 on the basis of the document operation request received by the client main control unit 303 from the user via the UI unit 302 as a URL history. The URL history is saved in the memory 202 or the HDD 209 by the URL history saving unit 306.

An interface 311 is used for a connection to the document management server via the network and is composed of the network controller (NC) 210, the network interface 211, or the like.

FIGS. 4 to 6 illustrate examples of display screens that are displayed by the UI unit 302 of the document management client application 301.

FIG. 4 illustrates a display example of the recommendation list at the time of a document selection. A main window 400 includes a navigation pane 411, a file list view pane 421, and a recommendation pane 431.

A library registered by the application and folders listed under the library are displayed in the navigation pane 411. The library mentioned herein refers to the unit of saving (for example, the unit of database) for carrying out the document management in the document management server 101. The document management server 101 provides one or more libraries and document management functions using folder structures under the respective libraries. The document management client 102 registers one or more libraries and utilizes the document management functions provided by the document management server 101. In the navigation pane, by selecting the library or the folder arranged under the library, the current location can be moved. In FIG. 4, libraries 412 to 414 and folders 415 and 416 under the library 412 are displayed in the navigation pane, and the folder 415 is selected as the current location.

Documents and folders stored at the currently selected location in the navigation pane 411 (that is, in the selected library or folder in the navigation pane 411) are displayed in the file list view pane 421. In FIG. 4, a sub folder 422 and documents 423 to 429 in the folder 415 selected as the current location in the navigation pane 411 are displayed in the file list view pane 421. In addition, a URL of the currently selected location in the navigation pane 411 is displayed on an address bar 406.

A back button 404 is a button for the user to give an instruction to be back to the location at the previous URL according to the URL history saving unit 306 that saves the history of the location (URL) selected in the navigation pane 411. A forward button 405 is a button for the user to give an instruction to proceed to the location at the next URL from the location at the URL returned by the back button 404 by referring to the URL history saving unit 306 that saves the history of the location (URL) selected in the navigation pane.

In addition, a panel 407 for giving instruction to switch between display and non-display of the pane includes a button 408 for switching between display and non-display of the navigation pane 411, a button 409 for switching between display and non-display of the recommendation pane 431, and the like.

In the recommendation pane 431, when an operation such as a library connection, a folder movement, or a document selection or opening is carried out, a recommended document with respect to the relevant operation is displayed. As illustrated in FIG. 4, in a case where a document "estimate sheet A.doc" is selected by the user via a mouse pointer 491 in the file list view pane 421, the recommended document related to the selected document "estimate sheet A.doc" is displayed.

A "library tab" 432 is a tab for displaying the recommendation list at a time when the operation of the library connection is conducted. In the recommendation list at the time of the library connection, documents and folders that are often utilized under the relevant library are enumerated by the document management server 101 as the related items under the relevant library.

A "folder and document tab" 433 is a tab for displaying the recommendation list at a time when the operation such as the current folder changing or the document selection or opening is conducted. In the recommendation list at the time of the current folder changing operation, in a case where the current folder is selected by the user, documents and sub folders that are often utilized under the selected folder are enumerated by the document management server 101 as the items related to the selected folder. Further, in the recommendation list at the time of the document selection or opening, in a case where the document (file) is selected by the user, documents that are often utilized with the relevant document are enumerated by the document management server 101 as the items related to the relevant document.

The "library tab" 432 and the "folder and document tab" 433 can be switched to be displayed through a tab selection by the mouse or the keyboard.

In addition, in a case where either the "library tab" 432 or the "folder and document tab" 433 is selected, UI components 434 to 456 which will be described below are displayed. A recommendation history back button 434, a recommendation history forward button 435, and a recommendation history listing display button 436 are displayed. These buttons are UI components for referring to recommendation history items saved in the recommendation history saving unit 305.

In a case where the recommendation history back button 434 is pressed, the client main control unit 303 displays the content of the recommendation list corresponding to the previous recommendation history item saved in the recommendation history saving unit 305 on a recommendation list display unit 439. Along with that operation, the client main control unit 303 changes the current reference location of the recommendation history item to the previous recommendation history item.

In a case where the recommendation history forward button 435 is pressed, the client main control unit 303 displays the content of the recommendation list corresponding to the next recommendation history item saved in the recommendation history saving unit 305 on the recommendation list display unit 439. Along with that operation, the client main control unit 303 changes the current reference location of the recommendation history item to the next recommendation history item.

In a case where the recommendation history listing display button 436 is pressed, the client main control unit 303 opens a recommendation history listing drop-down list box 461 illustrated in FIG. 5. Details of FIG. 5 will be described below.

A label 437 is a label indicating a name assigned to the recommendation list that is currently displayed on the recommendation list display unit 439. The name assigned to the recommendation list is composed of a character string indicating a type of the recommendation target, a character string indicating a name of the recommendation target, and a character string indicating a recommendation time in combination. For the "character string indicating the type of the recommendation target", in the case of the recommendation list at the time of the library connection operation, "library" is assigned, in the case of the recommendation list at the time of the current folder change operation, "folder" is assigned, and in the case of the recommendation list at the time of the document selection or opening operation, "document" is assigned. For the "character string indicating the name of the recommendation target", in the case of the recommendation list at the time of the library connection operation, "name of the relevant connected library" is assigned, in the case of the current folder change operation, "name of the relevant changed (selected) folder" is assigned, and in the case of the document selection or opening operation, "name of the relevant selected or opened document" is assigned. The "character string indicating the recommendation time" is a character string indicating date and time when the recommendation list is received as a response from the document management server 101.

A recommendation display pause button 438 is a toggle button for switching a state of being pressed or non-pressed. During the recommendation display pause button 438 being in the non-pressed state, a recommendation display pause function is turned OFF, and in response to the conduction of the operation such as the selection of the folder or the file by the user, the update of the recommendation display in the recommendation list display unit 439 is carried out as appropriate.

On the other hand, during the recommendation display pause button 438 being in the pressed state, the recommendation display pause function is turned ON, and the pause of the update of the recommendation display in the recommendation list display unit 439 is carried out. That is, during the recommendation display pause button 438 being in the pressed state, even when the user performs the operation such as the selection of the folder or the file, the occasional update of the recommendation display is not conducted, and the same recommendation list is kept displayed. Details of these configurations will be described below.

The recommendation list display unit 439 displays the content of the latest recommendation list obtained from the document management server 101 and the content of the recommendation list corresponding to the recommendation history item selected in the recommendation history.

Display examples 451 to 456 of the recommendation list are illustrated. Links 451 to 453 are links to the recommended documents and folders, and names of the respective documents and folders are displayed as labels. By clicking the label of the link by the mouse 205, the document at the link destination is opened. In addition, recommendation reasons 454 to 456 are characteristic strings indicating reasons why each of the documents and folders (451 to 453) is recommended. For the characteristic strings indicating the recommendation reasons, various characteristic strings are displayed in accordance with the type of the recommendation target and the recommended reason.

FIG. 5 illustrates an example of the display of the recommendation history listing drop-down list box 461. As described above, the recommendation history listing drop-down list box 461 is opened in a case where the recommendation history listing display button 436 is pressed via the cursor 491, and the recommendation history items saved in the recommendation history saving unit 305 are displayed. The number of items to be displayed in the list is set, for example, as up to ten in a reverse chronological order.

For the recommendation history items 464 to 468, the character strings of the labels assigned to the respective recommendation lists are displayed in the list.

In addition, a current reference location mark 462 is a mark indicating the current reference location of the recommendation history item. The marking is conducted on the basis of information on the current reference location of the recommendation history item held in the recommendation history saving unit 305. It is noted that when the client main control unit 303 receives the recommendation list from the document management server 101, the relevant received recommendation list corresponds to the latest recommendation history item. Therefore, when the latest recommendation list is displayed on the recommendation list display unit 439, in a case where the recommendation history listing drop-down list box 461 is opened, the label 464 corresponding to the relevant displayed recommendation list is marked with the current reference location mark 462. Further, in a case where the current reference location of the recommendation history item is changed by way of the recommendation history back button 434 or the recommendation history forward button 435, the label of the recommendation history item after the relevant change is marked with the current reference location mark 462.

When one of the recommendation history items 464 to 468 is clicked by the mouse 205, the content of the recommendation list corresponding to the clicked recommendation history item is displayed on the recommendation list display unit 439. That is, a way accessible to the respective recommendation history items held in the recommendation history saving unit 305 is provided. Further, the current reference location mark 462 is shifted to the label of the recommendation list of the clicked recommendation history item.

FIG. 6 illustrates a display example in a case where, during the recommendation display pause button 438 being in the pressed state, the recommendation history listing display button 436 is pressed and the recommendation history listing drop-down list box 461 is displayed.

A pause location mark 463 is a mark indicating the location of the recommendation history item corresponding to the recommendation list displayed at a time when the recommendation display pause button 438 is pressed and the pause of the recommendation is executed. The marking is conducted on the basis of information on the pause location of the recommendation history item held in the recommendation history saving unit 305. That is, the information on the pause location is set for the recommendation history item corresponding to the recommendation list displayed on the recommendation list display unit 439 at a time when the pause of the recommendation is executed.

Operation Upon Document Opening in Recommendation List

Figure 7A:
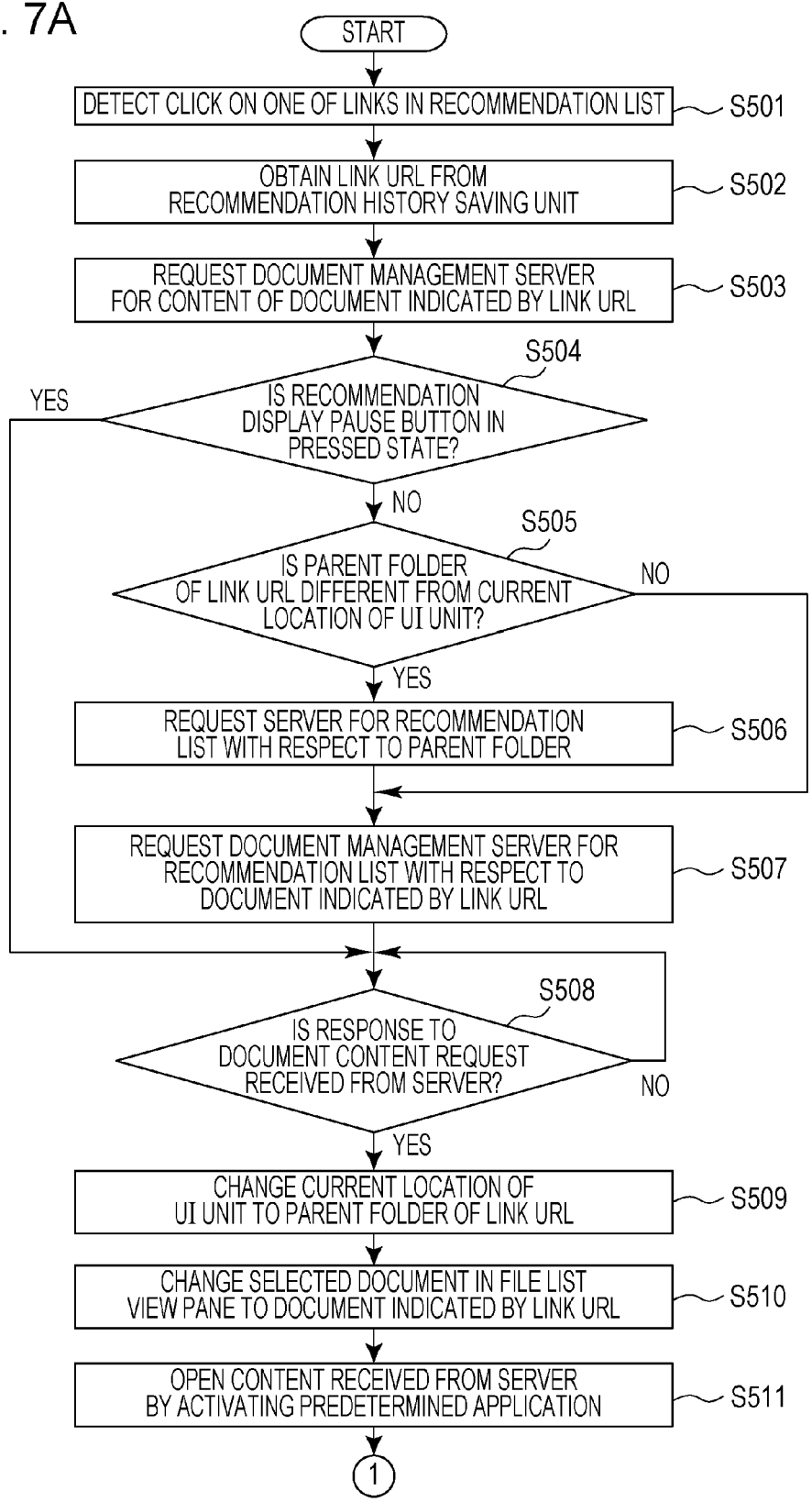
FIGS. 7A and 7B are flow charts of an operation at a time of opening a document in a recommended list.
Figure 7B:
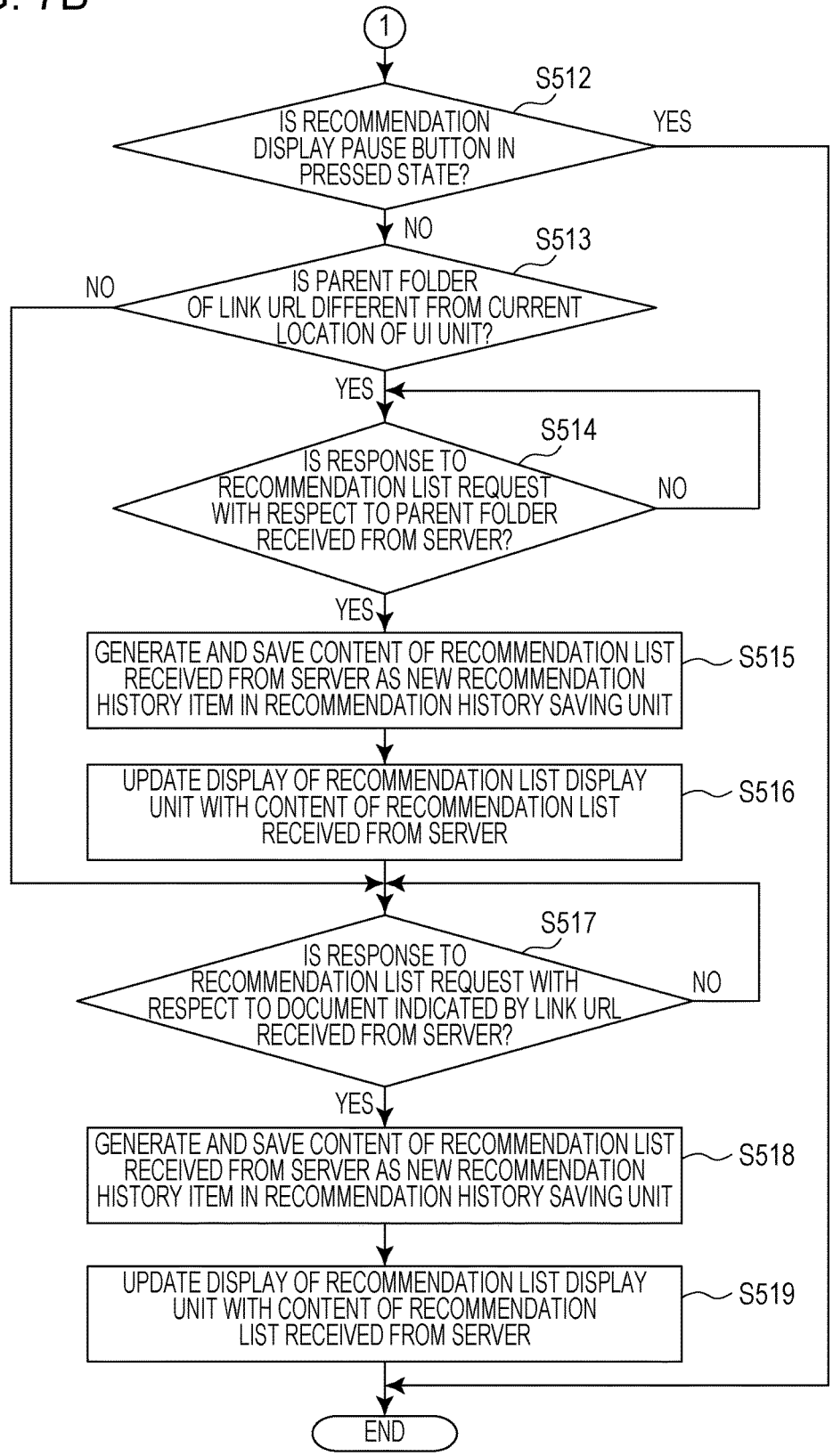

FIGS. 7A and 7B are flow charts illustrating an operation at a time of opening a document in the recommendation list. By using FIGS. 7A and 7B, a process of conducting the pause of the update of the recommendation display by the document management client application 301 will also be described.

As illustrated in FIG. 4, it is supposed that one of the links 451 to 453 is clicked (selected) when the recommendation list is displayed on the recommendation list display unit 439. Subsequently, in step S501, the client main control unit 303 detects that one of the links 451 to 453 is clicked, and the following steps are executed.

In step S502, the client main control unit 303 obtains the URL of the document or folder at the clicked link destination in step S501 from the recommendation list saved in the recommendation history saving unit 305. Hereinafter, a case will be described in which the URL of the link clicked in step S501 is the document.

In step S503, the client main control unit 303 requests the document management server 101 for the content of the document according to the URL of the link obtained in step S502.

In step S504, the client main control unit 303 determines whether or not the recommendation display pause button 438 is in the pressed state. When the recommendation display pause button 438 is in the pressed state, the process proceeds to step S508, and when the recommendation display pause button 438 is in the non-pressed state, the process proceeds to step S505.

In step S505, the client main control unit 303 determines whether or not the parent folder of the document indicated by the URL obtained in step S502 is different from the URL of the current location in the UI unit 302. The URL of the current location in the UI unit 302 means a location selected in the navigation pane 411 and refers to the URL displayed in the address bar 406. In a case where the URL of the parent folder of the document indicated by the URL obtained in step S502 is different from the folder selected as the current location in the UI unit 302, the process proceeds to step S506, and in a case where the URL is the same, the process proceeds to step S507.

In step S506, the client main control unit 303 requests the document management server 101 for the recommendation list corresponding to the parent folder of the document indicated by the URL obtained in step S502.

In step S507, the client main control unit 303 requests the document management server 101 for the recommendation list corresponding to the document indicated by the URL obtained in step S502.

In step S508, the client main control unit 303 stands by for receiving a response of the content of the document from the document management server 101 with respect to the request that is requested in step S503, and when the response of the content of the document is received, the process proceeds to step S509.

In step S509, the client main control unit 303 changes the current location in the UI unit 302 to the parent folder of the document indicated by the URL obtained in step S502. That is, the location selected in the navigation pane 411 is changed to the parent folder of the document indicated by the URL obtained in step S502, and the URL displayed in the address bar 406 is also changed to the URL of the parent folder. Further, since the parent folder of the document indicated by the URL obtained in step S502 is in the selected state in the navigation pane 411, the file list view pane 421 is also updated into listing of the documents and the sub folders in the relevant parent folder. It is noted that in a case where the URL of the parent folder of the document indicated by the URL obtained in step S502 is the same as the URL of the folder selected as the current location in the UI unit 302, the current location in the UI unit 302 is not changed.

In step S510, the client main control unit 303 sets the document indicated by the URL obtained in step S502 to the document in the selected state in the file list view pane 421. That is, a state equivalent to a state in which the selection operation of the relevant document is carried out by the mouse pointer 491 in the file list view pane 421 is established.

In step S511, the client main control unit 303 opens the content of the document received from the document management server 101 in step S508 by activating an application (such as word-processing software) with which the relevant content may be opened.

In step S512, the client main control unit 303 determines whether or not the recommendation display pause button 438 is in the pressed state. When the recommendation display pause button 438 is in the pressed state, the client main control unit 303 ends the processing, and when the recommendation display pause button 438 is in the non-pressed state, the process proceeds to step S513.

In step S513, the client main control unit 303 determines whether or not it has been determined in step S505 that the parent folder is different. In a case where it has been determined in step S505 that the parent folder is different, since the server is requested for the recommendation list with respect to the parent folder in step S506, the process proceeds to step S514 to wait for the response. In a case where it has been determined in step S505 that the parent folder is the same, the process proceeds to step S517.

In step S514, with regard to the request that is requested in step S506, the client main control unit 303 waits for the response regarding the recommendation list corresponding to the parent folder to be transmitted from the document management server 101. When receiving the response of the recommendation list corresponding to the parent folder, the client main control unit 303 advances the process to step S515.

In step S515, the client main control unit 303 generates and saves the content of the recommendation list corresponding to the parent folder received from the document management server 101 as a new recommendation history item in the recommendation history saving unit 305. At the time of the generation of the new recommendation history item, if the number of the recommendation history items saved in the recommendation history saving unit 305 is a maximum number of items that can be held, the client main control unit 303 performs the generation after deleting the oldest recommendation history item.

In step S516, the client main control unit 303 updates the display on the recommendation list display unit 439 with the content of the recommendation list corresponding to the parent folder which is received from the document management server 101.

In step S517, with regard to the request that is requested in step S507, the client main control unit 303 waits for the response regarding the recommendation list corresponding to the document to be transmitted from the document management server 101. When the response of the recommendation list corresponding to the document is received, the client main control unit 303 executes processing similar to the processing in steps S515 and S516 with respect to the recommendation list corresponding to the document in steps S518 and S519 and ends the process. That is, in step S518, the client main control unit 303 generates and saves the content of the recommendation list corresponding to the relevant document as a new recommendation history item in the recommendation history saving unit 305. Subsequently, in step S519, the client main control unit 303 updates the display on the recommendation list display unit 439 with the content of the recommendation list corresponding to the relevant document.

The case has been described as an example in which the URL of the link clicked in step S501 is the document, but the URL may be a folder. In that case, the operation in steps S510 and S511 in the above-described flow chart is omitted, and the parent folder of the document indicated by the URL obtained in step S502 is processed as the parent folder of the folder indicated by the URL obtained in step S502.

As described above, according to the embodiment of the present invention, when the recommendation display pause button 438 is in the pressed state, the client main control unit 303 does not request the document management server 101 for the recommendation list corresponding to the document (and the parent folder) at the clicked link destination. That is, when the recommendation display pause button 438 is in the pressed state, since the processing in steps S513 to S519 is not carried out, the recommendation list that is being displayed on the recommendation list display unit 439 is not updated.

If the user presses the recommendation display pause button 438, even when the link in the recommendation list is clicked, the recommendation list that is being displayed on the recommendation list display unit 439 at a time point of step S501 is not updated and remains unchanged. Therefore, in a case where the user wishes to check the plural documents in the recommendation list, if the pause button 438 is pressed, the recommendation list is not updated even when the link is clicked. Thus, by sequentially clicking the links to the respective documents, the content of each document can be sequentially checked.

Furthermore, as described above, according to the embodiment of the present invention, when the recommendation display pause button 438 is in the non-pressed state, in a case where the parent folder of the document indicated by the URL of the link clicked in step S501 is different from the folder selected as the current location in the UI unit 302, the recommendation list with respect to the parent folder is also obtained at the same time.

For that reason, in a case where the user is curious about the recommendation result with respect to the parent folder of the opened document, by pressing the recommendation history back button 434, the recommendation list with respect to the parent folder can be displayed on the recommendation list display unit 439.

In a case where the present exemplary embodiment is not applied, in order to obtain the recommendation list with respect to the folder, the folder change operation is to be conducted. That is, to find out the recommendation result with respect to the parent folder of the opened document, the user searches for and selects the parent folder of the relevant document opened in the navigation pane 411 or the like. According to the present exemplary embodiment, by pressing the recommendation history back button 434, it is possible to display the recommendation list with respect to the parent folder on the recommendation list display unit 439, and the labor can also accordingly be reduced.

Second Embodiment

The flow charts of FIGS. 7A and 7B described according to the first exemplary embodiment are executed when the link of the document is clicked. Therefore, after the user selects a new document during the pause of the recommendation result update, when the user is curious about the recommendation result with respect to the relevant document, even if the pause of the update of the recommendation display is released, the recommendation result with respect to the currently selected document is not displayed on the recommendation list display unit 439. That is, to obtain the recommendation result with respect to the currently selected document, after the recommendation display pause button 438 is changed to the non-pressed state, another document is selected in the file list view pane 421 to once change the currently selected document, and thereafter, the originally selected document is selected again.

According to the present second exemplary embodiment, a way of reducing labor of this operation will be described.

A new update way of the recommendation list at a time when the recommendation display pause button 438 is changed from the pressed state to the non-pressed state will be described.

Figure 8:
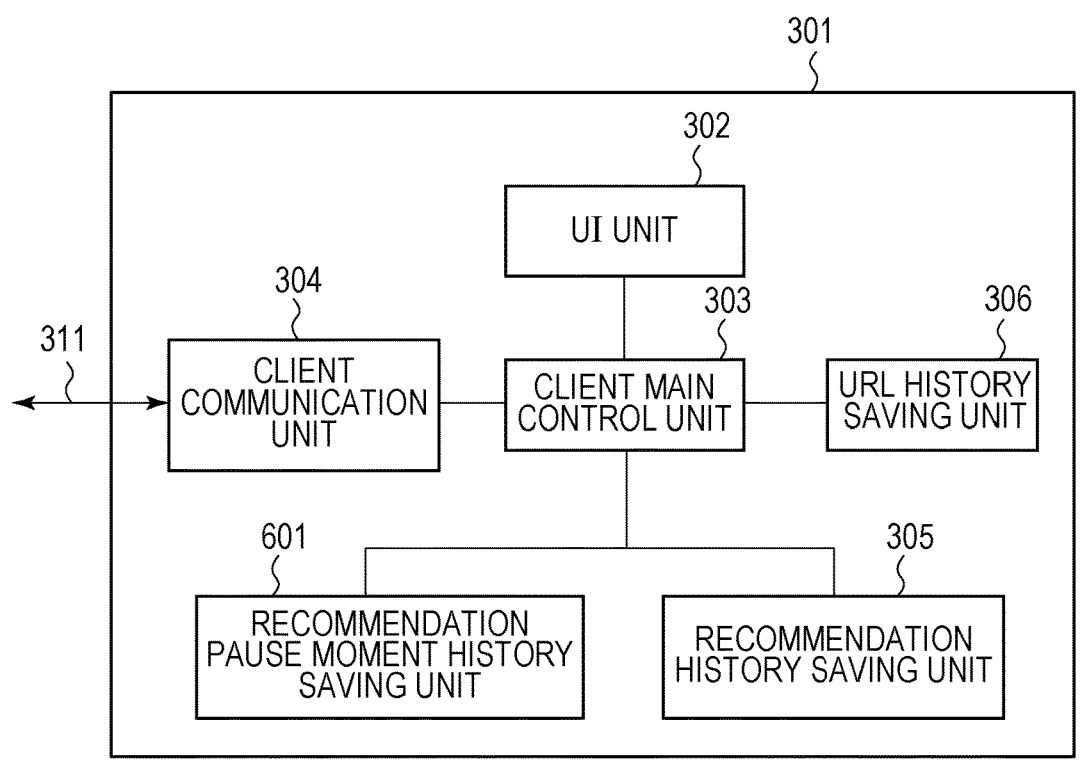
FIG. 8 is a block diagram for describing the software configuration of the document management client application according to a second exemplary embodiment of the present invention.

FIG. 8 is a block diagram for describing a software configuration of a document management client application 301 according to the second exemplary embodiment. A recommendation pause moment history saving unit 601 is added to the software configuration of the first exemplary embodiment.

The recommendation pause moment history saving unit 601 saves, in the memory 202 or the HDD 209, the recommendation list received as the response to the obtainment of the recommendation list from the document management server 101 when the recommendation display pause button 438 is in the pressed state, as a recommendation pause moment history. When the recommendation display pause button 438 is in the pressed state, each time the recommendation list is obtained from the document management server 101, the client main control unit 303 generates one recommendation pause moment history item corresponding to the recommendation list in the recommendation pause moment history saving unit 601. For the recommendation pause moment history item, the information on the recommendation list is held.

In addition, in the recommendation history saving unit 305 of the document management client application 301 according to the second exemplary embodiment, the recommendation history item including information on whether or not the location is a pause release location is held. The pause release location refers to information indicating the recommendation history item at the current reference location at a time when the recommendation pause is released and held in the format of TRUE/FALSE.

Figure 9A:
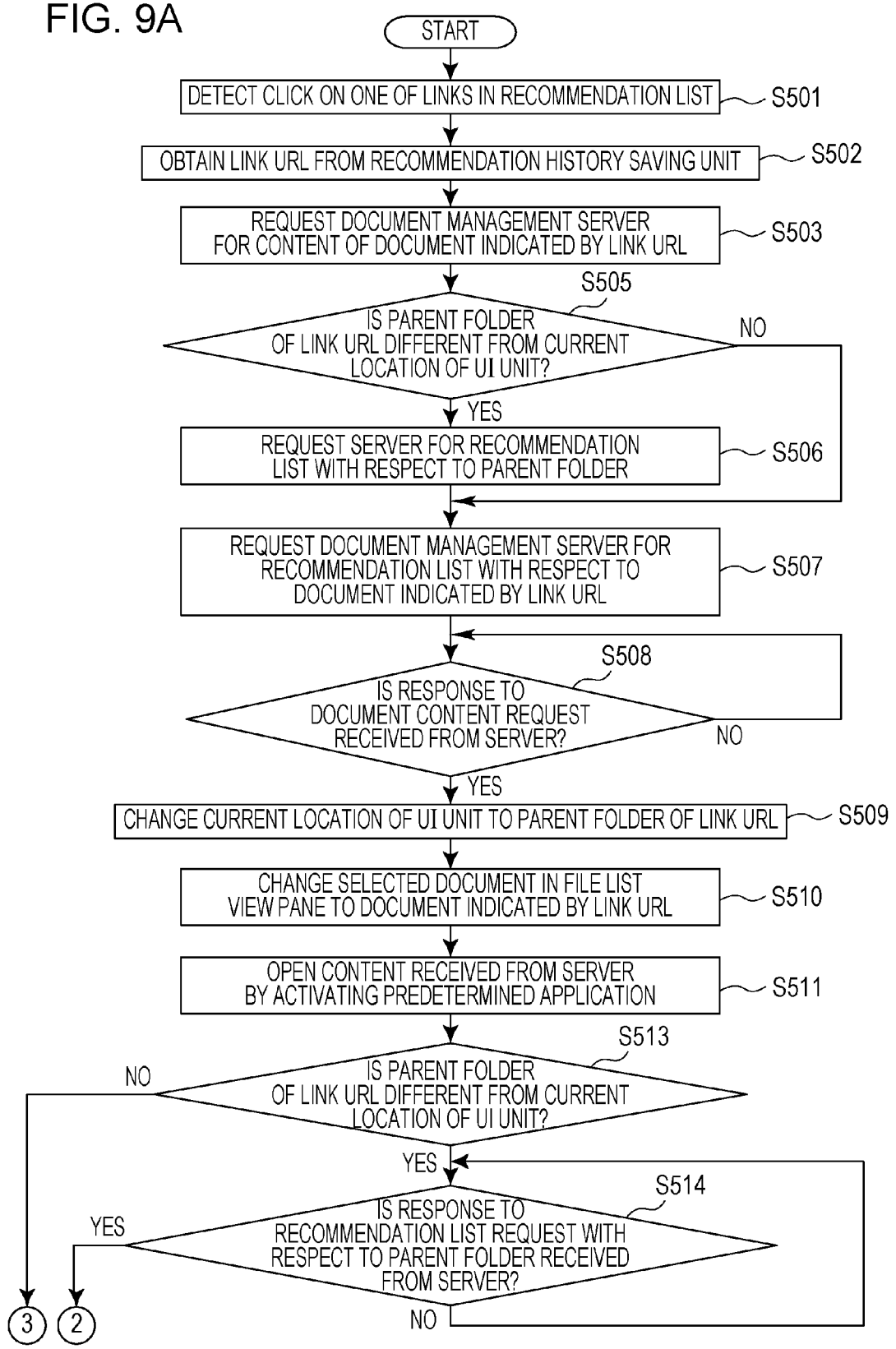

FIGS. 9A and 9B are flow charts illustrating an operation at a time of the opening of the document in the recommendation list in the document management client application 301 according to the second exemplary embodiment. Steps S504 and S512 are deleted from and steps S701 to S704 are added to the flow chart illustrating the operation at the time of the document opening of the recommendation list in the document management client application 301 according to the first exemplary embodiment. That is, since step S504 is deleted, even in a case where the recommendation display pause button is in the pressed state, the request for the recommendation list is made in steps S506 and S507. Hereinafter, the added steps S701 to S704 will be described.

In step S701, the client main control unit 303 determines whether or not the recommendation display pause button 438 is in the pressed state. When the recommendation display pause button 438 is in the pressed state, the process proceeds to processing in step S702, and when the recommendation display pause button 438 is in the non-pressed state, the process proceeds to step S515.

In step S702, the client main control unit 303 generates and saves the content of the recommendation list corresponding to the parent folder which is received from the document management server 101 as a new recommendation pause moment history item in the recommendation pause moment history saving unit 601.

In step S703, the client main control unit 303 determines whether or not the recommendation display pause button 438 is in the pressed state. When the recommendation display pause button 438 is in the pressed state, the flow proceeds to processing in step S704, and when the recommendation display pause button 438 is in the non-pressed state, the flow proceeds to processing in step S518.

In step S704, the client main control unit 303 generates and saves the content of the recommendation list corresponding to the document indicated by the link URL which is received from the document management server 101 as a new recommendation pause moment history item in the recommendation pause moment history saving unit 601.

Operation Upon Recommendation Pause Release

Figure 10A:
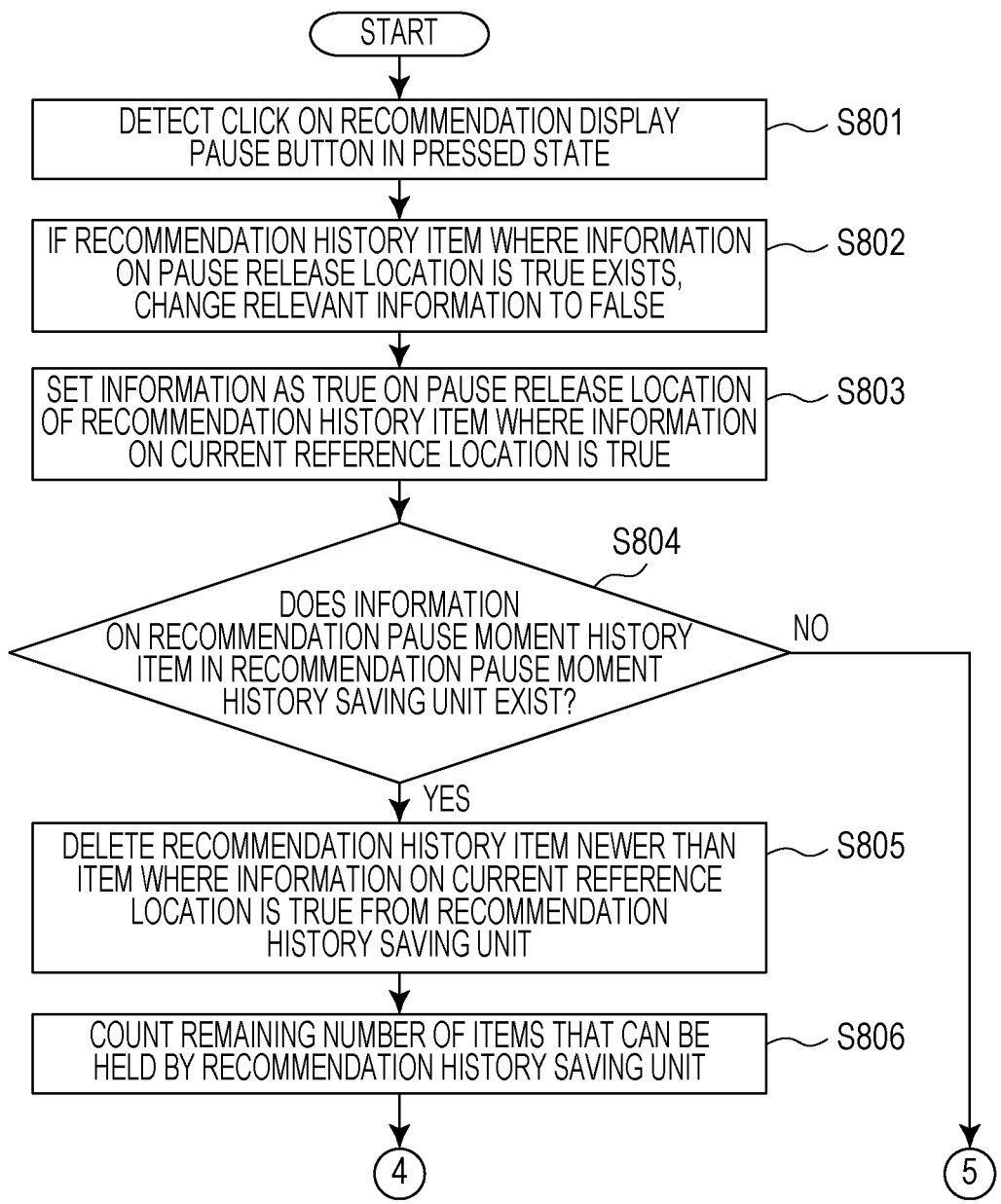

FIGS. 10A and 10B are flow charts illustrating an operation at a time when the recommendation display pause button 438 is changed from the pressed state to the non-pressed state in the document management client application 301 according to the second exemplary embodiment. By using FIGS. 10A and 10B, a process by the document management client application 301 at the time of the recommendation pause release will be described.

In step S801, when the client main control unit 303 detects that the recommendation display pause button 438 in the pressed state is clicked, the client main control unit 303 executes the following steps. That is, it is determined whether or not the release of the recommendation display pause is requested.

In step S802, when the recommendation history item where the information on the pause release location is TRUE exists in the recommendation history saving unit 305, the client main control unit 303 changes the information to FALSE.

In step S803, the client main control unit 303 sets the information on the pause release location with respect to the recommendation history item where the information on the current reference position is TRUE in the recommendation history saving unit 305 as TRUE.

In step S804, the client main control unit 303 checks whether or not information on one or more recommendation pause moment history items exist in the recommendation pause moment history saving unit 601. In a case where one or more recommendation pause moment history items exist in the recommendation pause moment history saving unit 601, the client main control unit 303 advances the process to step S805, and when the recommendation pause moment history item does not exist, the processing is ended.

In step S805, the client main control unit 303 deletes, from the recommendation history saving unit 305, the recommendation history item newer than the recommendation history item where the information on the current reference position is TRUE in the recommendation history saving unit 305.

In step S806, the client main control unit 303 subtracts the current number of the held histories from the maximum number of the recommendation histories that can be held in the recommendation history saving unit 305 to count the remaining number of the recommendation histories that can be held in the recommendation history saving unit 305.

In step S807, the client main control unit 303 determines whether or not the number of the recommendation pause moment history items held in the recommendation pause moment history saving unit 601 exceeds the remaining number of the recommendation histories that can be held in the recommendation history saving unit 305.

In a case where the number of the recommendation pause moment history items held in the recommendation pause moment history saving unit 601 exceeds the remaining number of the recommendation histories that can be held in the recommendation history saving unit 305, the client main control unit 303 advances the process to step S808, and when the number does not exceed the remaining number of the recommendation histories that can be held, the client main control unit 303 advances the process to step S809.

In step S809, the client main control unit 303 copies all pieces of information on the recommendation pause moment history items held in the recommendation pause moment history saving unit 601 as new recommendation history items in the recommendation history saving unit 305. At the time of the copying from the recommendation pause moment history saving unit 601, the client main control unit 303 generates one recommendation history item in the recommendation history saving unit 305 with respect to one recommendation pause moment history item.

In step S808, the client main control unit 303 determines whether or not the remaining number of the recommendation histories that can be held in the recommendation history saving unit 305 is five or higher. When the remaining number of the recommendation histories that can be held in the recommendation history saving unit 305 is five or higher, the flow proceeds to step S811, and when the remaining number is lower than five, the flow proceeds to step S810.

In step S810, the client main control unit 303 sequentially deletes the recommendation history or histories saved in the recommendation history saving unit 305 in a reverse chronological order so that the remaining number of the recommendation histories that can be held in the recommendation history saving unit 305 becomes five. After the deletion, the client control unit 303 advances the process to step S811.

In step S811, the client main control unit 303 copies the information on the recommendation pause moment history items by the number corresponding to the remaining number of the recommendation histories that can be held in the recommendation history saving unit 305 as new recommendation history items in the recommendation history saving unit 305. The client main control unit 303 selects the recommendation pause moment history items to be copied from the latest recommendation pause moment history items in the recommendation pause moment history saving unit 601 by the number corresponding to the remaining number of the recommendation histories that can be held in the recommendation history saving unit 305.

In step S812, the client main control unit 303 deletes all the recommendation pause moment history items in the recommendation pause moment history saving unit 601.

In step S813, the client main control unit 303 changes the recommendation history item where the information on the current reference position is TRUE in the recommendation history saving unit 305 to the latest recommendation history item copied from the recommendation pause moment history item. That is, the information on the current reference location of the latest recommendation history item copied from the recommendation pause moment history item is set as TRUE.

In step S814, the client main control unit 303 displays the content of the recommendation list of the latest recommendation history item copied from the recommendation pause moment history item on the recommendation list display unit 439.

In the above-described flow chart of FIG. 10B, in step S808, it is determined whether or not the remaining number of the recommendation histories that can be held in the recommendation history saving unit 305 is five or higher, and in step S810, the old recommendation history is deleted from the recommendation history saving unit 305 so that the remaining number becomes five. It is however noted that herein, the remaining number is not limited to five and may be one or higher. If the remaining number is one or higher, the recommendation result with respect to the latest operation can be reflected from the recommendation pause moment history saving unit 601 to the recommendation history saving unit 305.

Also, in the above-described flow chart, in step S810, the old recommendation history is deleted from the recommendation history saving unit 305 so that the remaining number becomes five, but the configuration is not limited to this. For example, the maximum number of the recommendation histories that can be held in the recommendation history saving unit 305 may temporarily be increased in step S810. For example, in a case where a normal maximum number of the recommendation histories that can be held in the recommendation history saving unit 305 is set as ten, when the recommendation history item is copied from the recommendation pause moment history saving unit 601 to the recommendation history saving unit 305, the maximum number may temporarily be increased to 15 in step S810. After that, when the recommendation history is newly added, sequentially, the maximum number may be returned to the original maximum number of ten. Alternatively, when a pause release location mark 901 in FIG. 11 which will be described below is deleted, the maximum number of the recommendation histories may be returned to the original maximum number of ten. That is, the pause release location mark is clicked and selected by the mouse 205 in the recommendation history listing drop-down list box 461 at the time of the recommendation pause release and can be deleted by a deletion key of the keyboard 204. When the relevant deletion operation is detected, the client main control unit 303 deletes the old recommendation history from the recommendation history saving unit 305, and the temporarily increased maximum number may be returned to the original maximum number.

Figure 11:
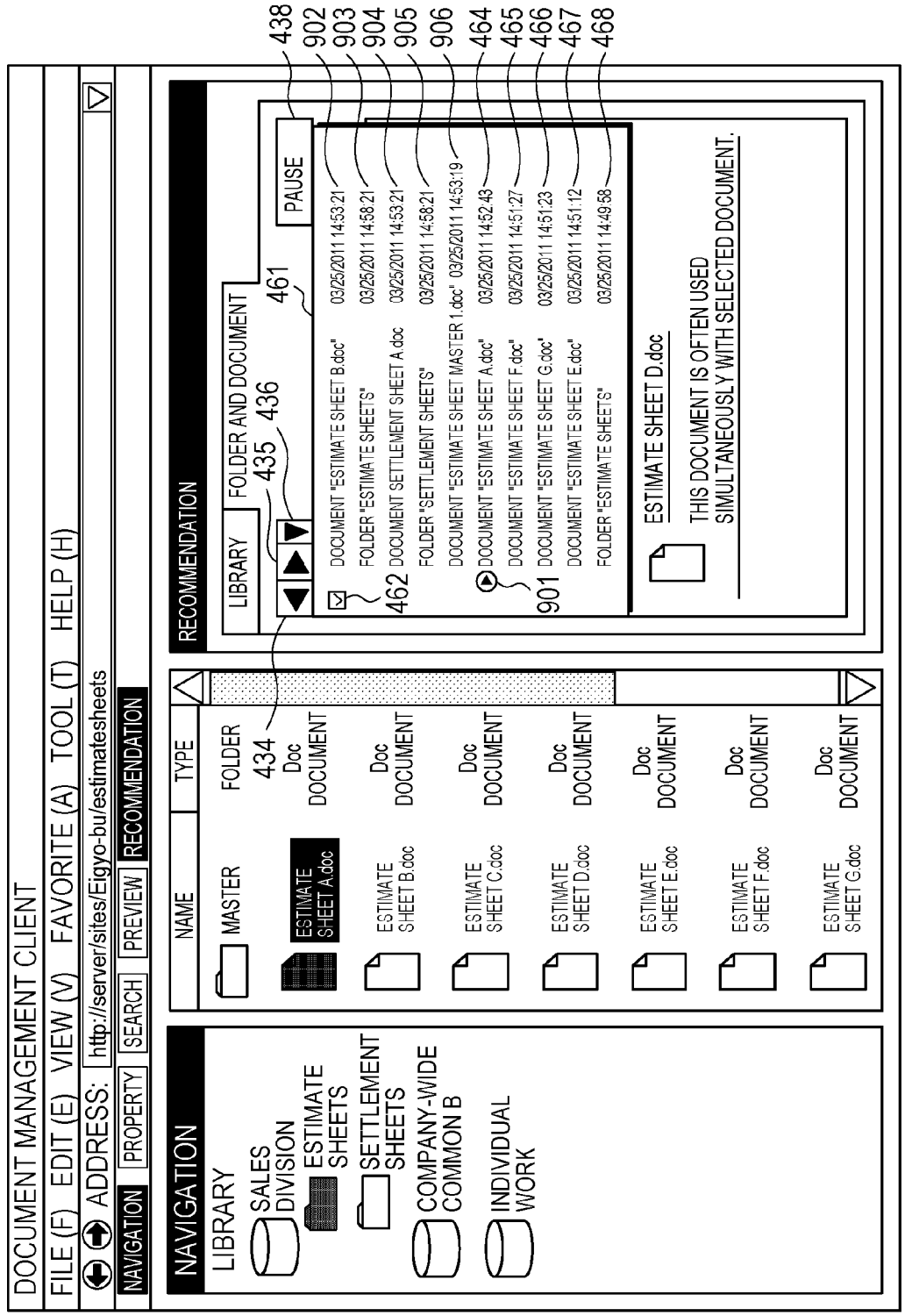
FIG. 11 illustrates an exemplary display of a recommendation history listing drop-down list box at a time when the recommendation pause is cancelled according to the second exemplary embodiment of the present invention.

FIG. 11 illustrates an example of a display of the recommendation history listing drop-down list box 461 at the time of the recommendation pause release in the document management client application 301.

In FIG. 11, the pause release location mark 901 is a mark indicating the recommendation history item at the current reference location at a time point just before the pause of the recommendation is released. The marking is conducted on the basis of the information on the pause release location of the recommendation history item held in the recommendation history saving unit 305.

Recommendation lists 902 to 906 of the recommendation history items copied from the recommendation pause moment history saving unit 601 are recommendation results in the operation during the recommendation pause.

As described above, according to the embodiment of the present invention, when the recommendation pause is released, the recommendation list displayed on the recommendation list display unit 439 corresponds to the recommendation result with respect to the latest operation. For that reason, when the pause of the update of the recommendation display is released, the user can check the recommendation result with respect to the document selected through the latest operation carried out during the pause on the recommendation list display unit 439. That is, the recommendation list 902 corresponding to the label 902 is displayed on a recommendation list display unit 439, and the current reference location mark 462 is assigned to the label 902.

Furthermore, as described above, according to the embodiment of the present invention, since the recommendation result with respect to the operation during the recommendation pause can be referred to as the latest history, the recommendation result during the recommendation pause can be checked on the recommendation list display unit 439 by pressing the recommendation history back button 434.

Furthermore, as described above, according to the embodiment of the present invention, in the recommendation history listing drop-down list box 461, the pause release location mark 901 is assigned to the recommendation history item at the current reference location at a time just before the pause of the recommendation is released. For that reason, the user can easily identify which recommendation history item is displayed during the recommendation update pause in the recommendation history listing drop-down list box 461. Therefore, also in a case where the user wishes to refer to the recommendation list displayed in the update pause again, the recommendation history item can be easily specified and displayed.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-266747 filed Dec. 6, 2011, which is hereby incorporated by reference herein in its entirety.

What is claimed is:

1. An information processing apparatus comprising:
a memory configured to store a computer program; and
at least one hardware processor configured to execute the computer program to perform a process which comprises:
displaying a plurality of items;
displaying a recommendation list including information of a recommended item related to a first item selected by a user, wherein when the user selects a second item, the display of the recommendation list is updated to a recommendation list including information of a second recommended item related to the selected second item;
determining whether or not an instruction for temporarily stopping updating the display of the recommendation list is issued;
stopping updating the display of the recommendation list if it is determined that that the instruction for temporarily stopping updating the display of the recommendation list is issued; and
receiving and opening a content of the first item selected by the user,
wherein after the user selects the second item, a content of the selected second item is received from a server and opened even if it is determined that the instruction for temporarily stopping updating the display of the recommendation list is issued.

2. The information processing apparatus according to claim 1, wherein the first item includes at least one of a document and a folder.

3. The information processing apparatus according to claim 1, the process further comprising:
managing a history of recommendation lists;
obtaining, in a case where the second item is selected from the recommendation list, a recommendation list related to a parent folder of the selected second item; and
obtaining a recommendation list related to the selected second item, wherein the obtained recommendation list related to the parent folder and the obtained recommendation list related to the selected second item are managed as the history.

4. The information processing apparatus according to claim 3, wherein in a case where it is determined that the instruction for temporarily stopping updating the display of the recommendation list is not issued, when the second item is selected by the user, the recommendation list related to the selected second item is displayed and furthermore, when a return of the history is instructed by the user, the recommendation list related to the parent folder of the selected second item is displayed.

5. The information processing apparatus according to claim 3, wherein in a case where it is determined that the instruction for temporarily stopping updating the display of the recommendation list is issued, even when the second item is selected by the user, a new recommendation list is not managed as the history.

6. The information processing apparatus according to claim 1, the process further comprising:
obtaining, in a case where the second item is selected, the recommendation list related to the selected second item; and
managing, in a case where it is determined that the instruction for temporarily stopping the display of the recommendation list is issued, the obtained recommendation list related to the selected second item as a pause moment history.

7. The information processing apparatus according to claim 6, the process further comprising:
obtaining, in a case where the second item is selected, a recommendation list related to a parent folder of the selected second item,
wherein in a case where it is determined that the instruction for temporarily stopping updating the display of the recommendation list is issued, the recommendation list related to the parent folder of the selected second item and the recommendation list related to the selected second item are managed as the pause moment history.

8. The information processing apparatus according to claim 6, wherein in a case where it is determined that the instruction for temporarily stopping updating the display of the recommendation list is issued, when the second item is selected, the display of the recommendation list is not updated, but the recommendation list related to the selected second item is managed as the history.

9. The information processing apparatus according to claim 8, the process further comprising:
detecting a release from the instruction for temporarily stopping updating the display of the recommendation list,
wherein in a case where the release from the instruction for temporarily stopping updating the display of the recommendation list is detected, the display of the recommendation list is updated by using the managed recommendation list.

10. The information processing apparatus according to claim 9, the process further comprising:
assigning, in a case where the release from the instruction for temporarily stopping updating the display of the recommendation list is detected, a pause release location mark for identifying a recommendation list that is displayed at the release in a listing of the managed recommendation list.

11. The information processing apparatus according to claim 1, the process further comprising:
assigning a current reference location mark for identifying a currently displayed recommendation list in a listing of the recommendation list.

12. An information processing method comprising:
displaying a plurality of items;
displaying a recommendation list including information of a recommended item related to a first item selected by a user, wherein, when the user selects a second item, the display of the recommendation list is updated to a recommendation list including information of a second recommended item related to the selected second item;
determining whether or not an instruction for temporarily stopping updating the display of the recommendation list is issued;
stopping updating the display of the recommendation list if it is determined that the instruction for temporarily stopping updating the display of the recommendation list is issued, and
receiving from a server and opening, after the user selects the second item, a content of the selected second item even if it is determined that the instruction for temporarily stopping updating the display of the recommendation list is issued.

13. A non-transitory computer-readable storage medium storing a computer program for causing a computer to perform a process comprising:
displaying a plurality of items;
displaying a recommendation list including information of a recommended item related to a first item selected by a user, wherein when the user selects a second item, the display of the recommendation list is updated to a recommendation list including information of a second recommended item related to the selected second item;
determining whether or not an instruction for temporarily stopping updating the display of the recommendation list is issued;
controlling not to update the display of the recommendation list if it is determined that the instruction for temporarily stopping updating the display of the recommendation list is issued; and
controlling to receive and open a content of the first item selected by the user,
wherein after the user selects the second item, receive from a server and open a content of the selected second item selected by the user even if it is determined that the instruction for temporarily stopping updating the display of the recommendation list is issued.

* * * * *